May 31, 1955
R. A. SANDBERG
2,709,375
SPUR GEAR
Filed Feb. 3, 1950
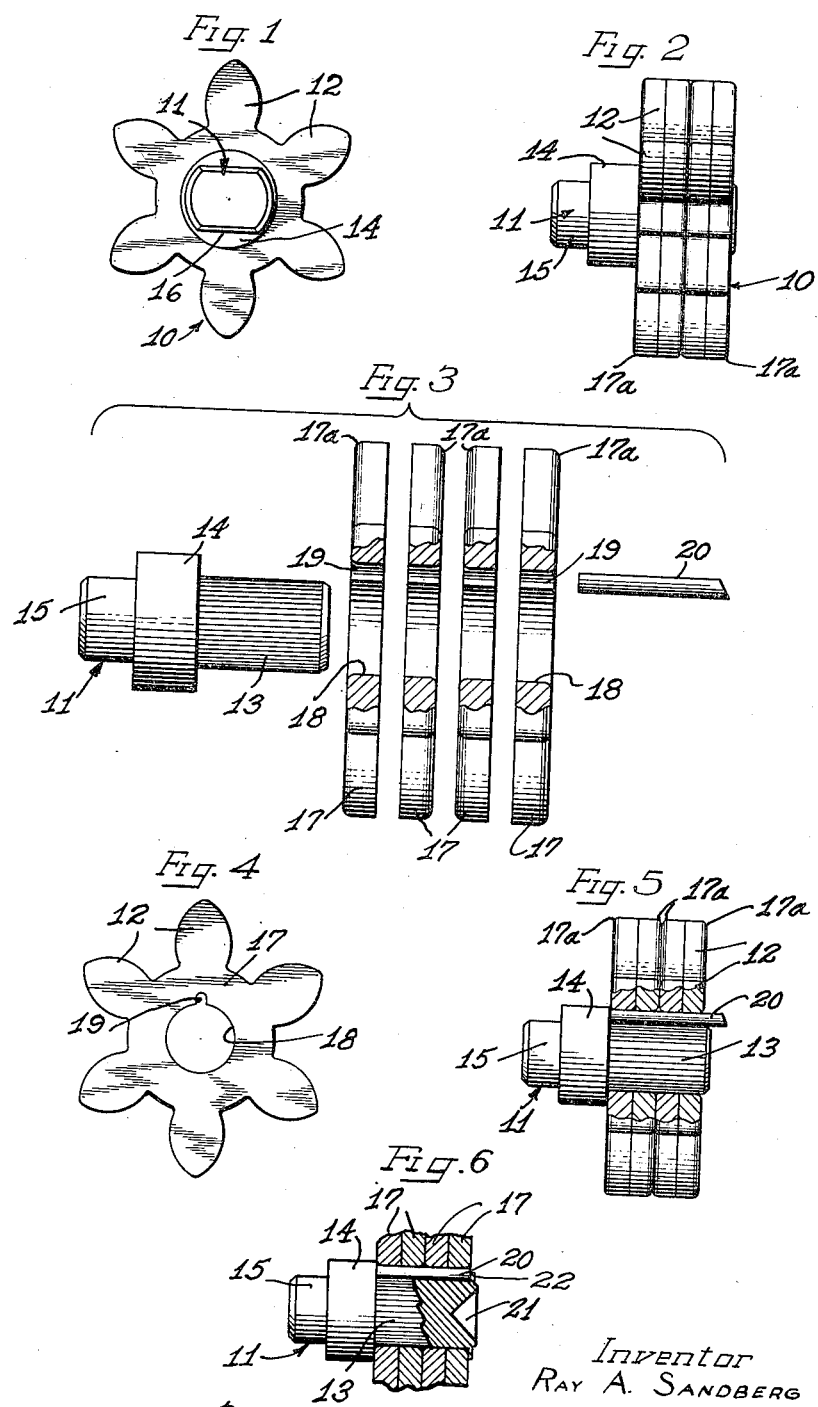
Inventor
Ray A. Sandberg

United States Patent Office 2,709,375
Patented May 31, 1955

2,709,375

SPUR GEAR

Ray A. Sandberg, Waukegan, Ill., assignor to Houdaille-Hershey Corporation, Detroit, Mich., a corporation of Michigan Application February 3, 1950, Serial No. 142,100

1 Claim. (Cl. 74—445)

The present invention relates to a spur gear and the method of making the same. More particularly, the present invention relates to a laminated spur gear in which a plurality of sheet metal stampings are secured to an axial hub and a method of making such a gear.

Prior to the present invention, spur gears have typically been manufactured by hobbing or otherwise machining a solid piece of metal to define the desired toothed contour and hub of the gear. In the manufacture of relatively small gears, such as those employed in door latches or the like, this method has proved to be quite expensive so that great deal of the cost of the latch has been taken up by the gears thereof.

The present invention now provides a novel method for manufacturing spur gears by the elimination of the expensive, heretofor necessary machining operation. The method of the present invention includes stamping to the outline of the finished gear a plurality of laminae blanks, each provided with a plurality of radial teeth and a central axially extending aperture for the reception of a hub. Next, the laminae are assembled upon a hub in axially aligned, radially conforming relation so that the assembly presents the peripheral contour of a finished gear. The laminae then are secured to the hub by suitable means, as by brazing.

The method of the present invention particularly contemplates the interposing of brazing material between the hub and the laminae, preferably during assembly of the laminae on the hub, with the later brazing of the assembly securing the laminae to the hub and to one another. Also, if desired, one end of the hub may be radially outwardly deformed to overlie one extremity of the laminae assembly to secure the laminae thereon during the brazing operation.

The novel spur gear of the present invention comprises a hub and a plurality of laminae secured to the hub in axial and peripheral alignment to define a toothed spur gear periphery having an axial length equivalent to the total thickness of the laminae assembled thereon. The laminae are secured to the hub by suitable means, as by brazing, and also, if desired or necessary, between radially extending shoulders formed on the hub. To aid in securing the laminae to the hub, that hub section receiving the laminae may be grooved, knurled, or otherwise roughened to present a more desirable brazing surface.

It is, therefore, an important object of the present invention to provide a novel form of spur gear including a plurality of toothed laminae secured to a central hub to define the gear teeth.

Another important object of the present invention is to provide a novel method for the manufacture of a spur gear by the assembly of a plurality of laminae in axially and peripherally aligned relation upon a hub and securing the laminae to the hub by suitable means.

It is a further important object of the present invention to provide a novel type of spur gear including a plurality of axially aligned laminae brazed to a supporting hub and to one another to define a finished gear.

Still another important object of the present invention is to provide an improved method for making a spur gear including the steps of stamping from sheet metal a plurality of laminae each having a toothed periphery, assembling the laminae in axially and peripherally aligned relation upon an axially extending hub, and brazing the laminae to the hub by suitable heat treatment.

Other and further important objects of this invention will be apparent from the disclosures in the specification and the accompanying drawings.

On the drawings:

Figure 1 is a front elevational view of a spur gear of the present invention;

Figure 2 is a side elevational view of the gear of Figure 1;

Figure 3 is an exploded side elevational view, with parts broken away and in section, illustrating the method of assembly of the gear in Figure 1;

Figure 4 is a front elevational view of a laminae of the present invention;

Figure 5 is a side elevational view, similar to Figure 2, with parts broken away and in section, illustrating the gear prior to brazing; and Figure 6 is a fragmentary side elevational view with parts broken away and in section of a modified form of gear of the present invention prior to brazing.

As shown on the drawings:

In Figures 1 and 2 reference numeral 10 refers generally to a gear of the present invention including a hub 11 and radially extending gear teeth 12.

More particularly, the hub 11, as best shown in Figure 3, includes a shank portion 13 provided with peripheral, longitudinally or axially extending grooves forming a knurled shank exterior surface. The shank 11 is also provided with a radially extending enlarged intermediate shoulder 14 and a forwardly extending reduced portion 15 having opposed laterally extending flat shoulders 16.

The teeth 12 are defined by a plurality of individual stamped laminae 17 (Figure 4), each of which defines the peripheral outline of the completed tooth arrangement. These laminae 17 are employed to eliminate the heretofore necessary machining operation as will be hereinafter described in greater detail. It will also be noted in Figure 4 that the lamina is provided with a central, axially extending aperture 18 of substantially the same size as the knurled shank 13 of the hub 11. A relatively small radially extending aperture 19 communicates with the aperture 18 so as to provide a key-slot for a purpose to be hereinafter explained.

The method of making a spur gear of the present invention includes the steps of forming the hub 11 and knurling the shank 13. The tooth blanks or the laminae 17 are stamped from sheet metal, the number of blanks in the assembly depending upon the thickness of sheet metal employed and the desired axial tooth lengths. As is well known in the art, upon the stamping of the tooth blanks, that surface of the blank facing the stamping die will be slightly rounded or contoured at the edges of the cut blank, as at 17a (Figure 3), while that edge facing the backing die will be substantially plane.

The blanks are next telescoped onto the fluted or knurled shank 13, the shank being received by the central aperture 18 of the blanks. The assembly of the blanks is thus accomplished upon the hub and, preferably, the blanks are oriented during assembly, so that the rounded edges of each respective pair of blanks are oppositely directed. In this manner, the smoothly mating surfaces of the blanks are placed in abutment, that is, those faces of the blanks held against the backing die during the stamping of the blanks are placed in abutment during assembly. In this manner, each of the blanks smoothly abuts an adjacent blank throughout its entire radial dimension length while the opposing free edges of the tooth stamping assembly are provided with smoothly contoured edges 17a (Figure 5).

Following assembly of the blanks 17 upon the knurled hub shank 13, a brazing rod or wire 20 is inserted through the aligned key slots 19 of the blanks. The brazed wire 20 is thus interposed between the inner portion of each of the blanks and the hub shank. Alternatively, the wire 20 may be placed upon the shank 13 in its proper position and the blanks simultaneously telescoped over the shank 13 and the wire 20. Again, the laminae may be assembled on the wire 20 and the laminae-wire sub-assembly then telescoped over the hub shank. Preferably the wire is closely fitted as in a press fit, within the key slot 19, between the laminae 17 and the shank 13, so that the wire serves to maintain the blanks on the shank 13 during assembly and during the subsequent brazing operation. Also, the wire serves to index the laminae on the hub, so that the laminae teeth are aligned.

Following assembly, the flat opposed shoulders 16 may be milled on the forward projection 15 of the hub 11 and the brazing operation may now be carried out. The brazing operation is preferably carried out in a reducing atmosphere, as in a hydrogen atmosphere, and a liquid salt bath maintained at a temperature of approximately 1600° F. may be employed. Following brazing, the assembly is preferably quenched in oil to obtain a file hard surface and as a finishing step, the assembly may be zinc plated or otherwise finished as desired.

During the brazing operation, the brazing wire 20 is melted and runs about the periphery of the knurled shank 13 between the shank and the apertures 18 of each of the laminations to secure the laminae to the shank. Also, a metal will be introduced between adjacent laminae so that the exterior faces of the laminae are secured by the brazing metal. The extra length of the brazing wire 20 projecting axially beyond the rearmost lamina is provided so that sufficient metal for the brazing operation will be available. Also the enlarged radial shoulder 14 serves as an indexing or bottoming means for accurately positioning the laminae for axially telescoped relation on the shank 13.

In that embodiment of the invention shown in Figure 6, the extremity of the shank 13 remote from the shoulder 14 is recessed as at 21. The conical recess 21 may be formed by a drilling or punching operation and the recessed end of the shank is later staked or otherwise deformed radially outwardly to overlie the adjacent exterior side surface of the rearmost lamina 17. In this manner, the laminae 17 are securely locked upon the shank 13 against axial movement prior to the brazing operation and also subsequent to the brazing operation.

Any small surface irregularities between the straight annular end flange 22 thus formed on the shank 13 and the exterior surface of the rearmost lamina will be filled by brazing metal after the brazing operation.

The advantages, both the article and the method, hereinbefore disclosed will be readily appreciated by those skilled in the art. The present invention eliminates the necessity of hobbing or otherwise machining the spur gear from a solid piece of metal. The inexpensive stamping operation which has been substituted for the machining results in a considerable saving of metal, skilled labor and expensive machine tools. Further, spur gears of any desired axial length may be made from the same set of stamping dies by merely lengthening the shank 13 and telescoping an increased number of laminae 17 thereon.

The brazing rod or wire 20, by cooperating with the knurled shank 15 and the recesses 19 of the laminae 17, prevents relative radial displacement of the teeth 12 of the laminae 17 during the brazing and assembly operation. In addition, in the embodiment of Figure 6, the staking operation performed upon the shank itself securely locks the laminae against unwarranted axial movement. Further, the employment of brazing metal and the brazing operation itself forms the laminae and shank into an integral structure.

It will be understood that modifications and variations may be effected without departing from the scope of the novel concepts of the present invention.

I claim as my invention:

A spur gear comprising a hub having a radially enlarged shoulder and a shank projecting axially from said shoulder, a plurality of stamped gear blanks telescoped on said shank and bottomed against said shoulder, said blanks each having one planar side surface and an opposing surface having rounded edge portions, said gear blanks being secured to each other and to said hub in axial alignment and in flush surface engagement, with the free faces of the blank assemblies being formed by the rounded edge portions of the terminal blanks of the assembly.

References Cited in the file of this patent

UNITED STATES PATENTS

| | | |
|---|---|---|
| 776,737 | Greenfield | Dec. 6, 1904 |
| 846,549 | Clark | Mar. 12, 1907 |
| 858,258 | Briscoe et al. | June 25, 1907 |
| 1,166,402 | Farquhar | Dec. 28, 1915 |
| 1,308,160 | Brinton | July 1, 1919 |
| 1,546,418 | Stresan | July 21, 1925 |
| 1,654,306 | Paszowski | Dec. 27, 1927 |
| 2,206,831 | Berthelson | July 2, 1940 |
| 2,302,505 | Rayniak | Nov. 17, 1942 |
| 2,362,106 | Ungar et al. | Nov. 7, 1944 |
| 2,364,109 | Taylor | Dec. 5, 1944 |